(12) United States Patent
Kano

(10) Patent No.: US 11,305,615 B2
(45) Date of Patent: Apr. 19, 2022

(54) AIR CONDITIONER FOR VEHICLE

(71) Applicant: DENSO CORPORATION, Kariya (JP)

(72) Inventor: Takekazu Kano, Kariya (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 16/902,814

(22) Filed: Jun. 16, 2020

(65) Prior Publication Data

US 2020/0307358 A1 Oct. 1, 2020

Related U.S. Application Data

(63) Continuation of application No. PCT/JP2018/042354, filed on Nov. 15, 2018.

(30) Foreign Application Priority Data

Dec. 18, 2017 (JP) .............................. JP2017-241645

(51) Int. Cl.
*B60H 1/32* (2006.01)
(52) U.S. Cl.
CPC ......... *B60H 1/3217* (2013.01); *B60H 1/3233* (2013.01)
(58) Field of Classification Search
CPC B60H 1/3217; B60H 1/3233; B60H 1/00285; B60H 1/3225; B60H 2001/00178; B60N 2/5635; B60N 2/5657; B60N 2/5692
See application file for complete search history.

(56) References Cited

U.S. PATENT DOCUMENTS

2006/0016475 A1   1/2006   Hirota

FOREIGN PATENT DOCUMENTS

| JP | 2006-131106 A | 5/2006 |
| JP | 2015-038390 A | 2/2015 |
| JP | 2016-145015 A | 8/2016 |

*Primary Examiner* — Emmanuel E Duke
(74) *Attorney, Agent, or Firm* — Oliff PLC

(57) ABSTRACT

An air conditioner includes an air conditioning unit installed in a cabin, and a supply unit supplying air conditioned by the air conditioning unit to the cabin. The air conditioning unit includes a refrigeration cycle device having a compressor, a radiator, a decompression device, and an evaporator. One of the radiator and the evaporator functions as a use-side heat exchanger that generates conditioned air by heat exchange between refrigerant and air. The refrigeration cycle device has a high-pressure protection device that discharges the refrigerant to the outside when the pressure of the refrigerant flowing through a passage, which is defined from a refrigerant discharge side of the compressor to a refrigerant inlet side of the decompression device, exceeds a predetermined reference pressure. The high-pressure protection device is configured to discharge the refrigerant to the outside through an outside communication portion communicated with the outside of the cabin.

6 Claims, 10 Drawing Sheets ered air; and a supply unit configured to supply the conditioned air generated by the air conditioning unit into the cabin. The air conditioning unit includes a refrigeration cycle device having a compressor for compressing and discharging a refrigerant, a radiator for radiating heat of the refrigerant discharged from the compressor, a decompression device for decompressing the refrigerant passing through the radiator, and an evaporator for evaporating the refrigerant passing through the decompression device. A
AIR CONDITIONER FOR VEHICLE

CROSS REFERENCE TO RELATED APPLICATIONS

The present application is a continuation application of International Patent Application No. PCT/JP2018/042354 filed on Nov. 15, 2018, which designated the U.S. and claims the benefit of priority from Japanese Patent Application No. 2017-241645 filed on Dec. 18, 2017. The entire disclosures of all of the above applications are incorporated herein by reference.

TECHNICAL FIELD

The present disclosure relates to an air conditioner for a vehicle.

BACKGROUND

An air conditioner includes an air conditioning unit disposed in a cabin of a vehicle. A refrigeration cycle device of the air conditioning unit has a compressor, a radiator, a decompression device, and an evaporator.

SUMMARY

An air conditioner for a vehicle includes: an air conditioning unit disposed in a cabin of the vehicle to generate conditioned air; and a supply unit configured to supply the conditioned air generated by the air conditioning unit into the cabin. The air conditioning unit includes a refrigeration cycle device having a compressor for compressing and discharging a refrigerant, a radiator for radiating heat of the refrigerant discharged from the compressor, a decompression device for decompressing the refrigerant passing through the radiator, and an evaporator for evaporating the refrigerant passing through the decompression device. A high-pressure refrigerant passage is defined from a refrigerant discharge side of the compressor to a refrigerant inlet side of the decompression device. The refrigeration cycle device is configured such that one of the radiator and the evaporator functions as a use-side heat exchanger that generates the conditioned air by heat exchange between refrigerant and air. The refrigeration cycle device includes a high-pressure protection device for discharging the refrigerant to the outside when a pressure of the refrigerant flowing through the high-pressure refrigerant passage exceeds a predetermined reference pressure. The high-pressure protection device is configured to discharge the refrigerant to the outside through an outside communication portion communicated with outside of the cabin.

DESCRIPTION OF EMBODIMENT

Figure 1:
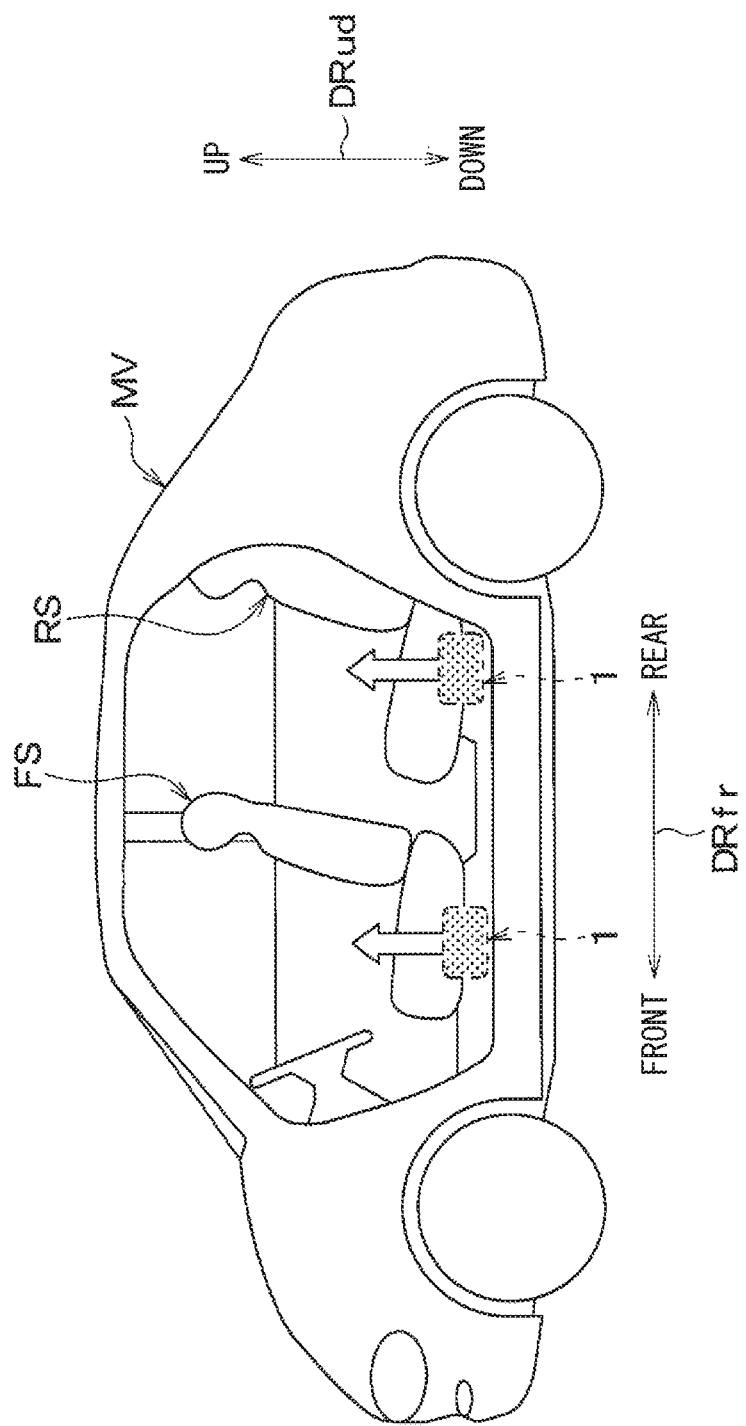
FIG. 1 is a schematic diagram of a vehicle to which an air conditioner according to a first embodiment is applied.

An air conditioner has an air conditioning unit to provide conditioned air to a vehicle cabin, and a refrigeration cycle device includes a compressor, a radiator, a decompression device, and an evaporator.

The refrigeration cycle device may have a high-pressure protection device that discharges the refrigerant to the outside when the pressure of the refrigerant exceeds a predetermined pressure so that the refrigerant circulating inside does not have an abnormally high pressure.

However, in case where the air conditioning unit including the compressor, the radiator, the decompression device, and the evaporator is arranged in the vehicle cabin, when the pressure of the refrigerant exceeds a predetermined pressure, the refrigerant is discharged in the vehicle cabin via the high-pressure protection device.

The present disclosure provides an air conditioner for a vehicle, which can suppress discharge of refrigerant in a vehicle cabin while an air conditioning unit including a compressor, a radiator, a decompression device, and an evaporator is arranged in the vehicle cabin.

According to one aspect of the present disclosure, an air conditioner for a vehicle includes: an air conditioning unit disposed in a cabin of the vehicle to generate conditioned air; and a supply unit configured to supply the conditioned air generated by the air conditioning unit into the cabin. The air conditioning unit includes a refrigeration cycle device having a compressor for compressing and discharging a refrigerant, a radiator for radiating heat of the refrigerant discharged from the compressor, a decompression device for decompressing the refrigerant passing through the radiator, and an evaporator for evaporating the refrigerant passing through the decompression device. A high-pressure refrigerant passage is defined from a refrigerant discharge side of the compressor to a refrigerant inlet side of the decompression device. The refrigeration cycle device is configured such that one of the radiator and the evaporator functions as a use-side heat exchanger that generates the conditioned air by heat exchange between refrigerant and air. The refrigeration cycle device includes a high-pressure protection device for discharging the refrigerant to the outside when a pressure of the refrigerant flowing through the high-pressure refrigerant passage exceeds a predetermined reference pressure. The high-pressure protection device is configured such that the refrigerant discharged to the outside flows to an outside communication portion communicated with outside of the cabin.

Accordingly, since the refrigerant discharged from the high-pressure protection device is discharged to the outside of the cabin through the outside communication portion, it is possible to suppress the discharge of the refrigerant into the cabin, while the air conditioning unit including the compressor, the radiator, the decompression device, and the evaporator is arranged in the cabin.

Embodiments of the present disclosure will be described below with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. In the following embodiments, the embodiments can be partially combined with each other as long as the embodiments do not cause any trouble in combination, even if the combination is not specified in particular.

First Embodiment

The present embodiment will be described with reference to FIGS. 1 to 5. An arrow DRud shown in FIG. 1 indicates the up-down direction in a vehicle MV. An arrow DRfr shown in FIG. 1 indicates the front-rear direction of the vehicle MV.

As shown in FIG. 1, the vehicle MV includes a seat air conditioner provided on a front seat FS and a rear seat RS as a vehicle air conditioner 1 conditioning air for a cabin of the vehicle.

The vehicle air conditioner 1 constitutes an individual air conditioner that conditions air for a specific location inside the cabin. In the present embodiment, the vehicle air conditioner 1 is provided on each of the front seat FS and the rear seat RS. The vehicle air conditioner 1 may be installed on, for example, only one of the front seat FS and the rear seat RS.

Figure 2:
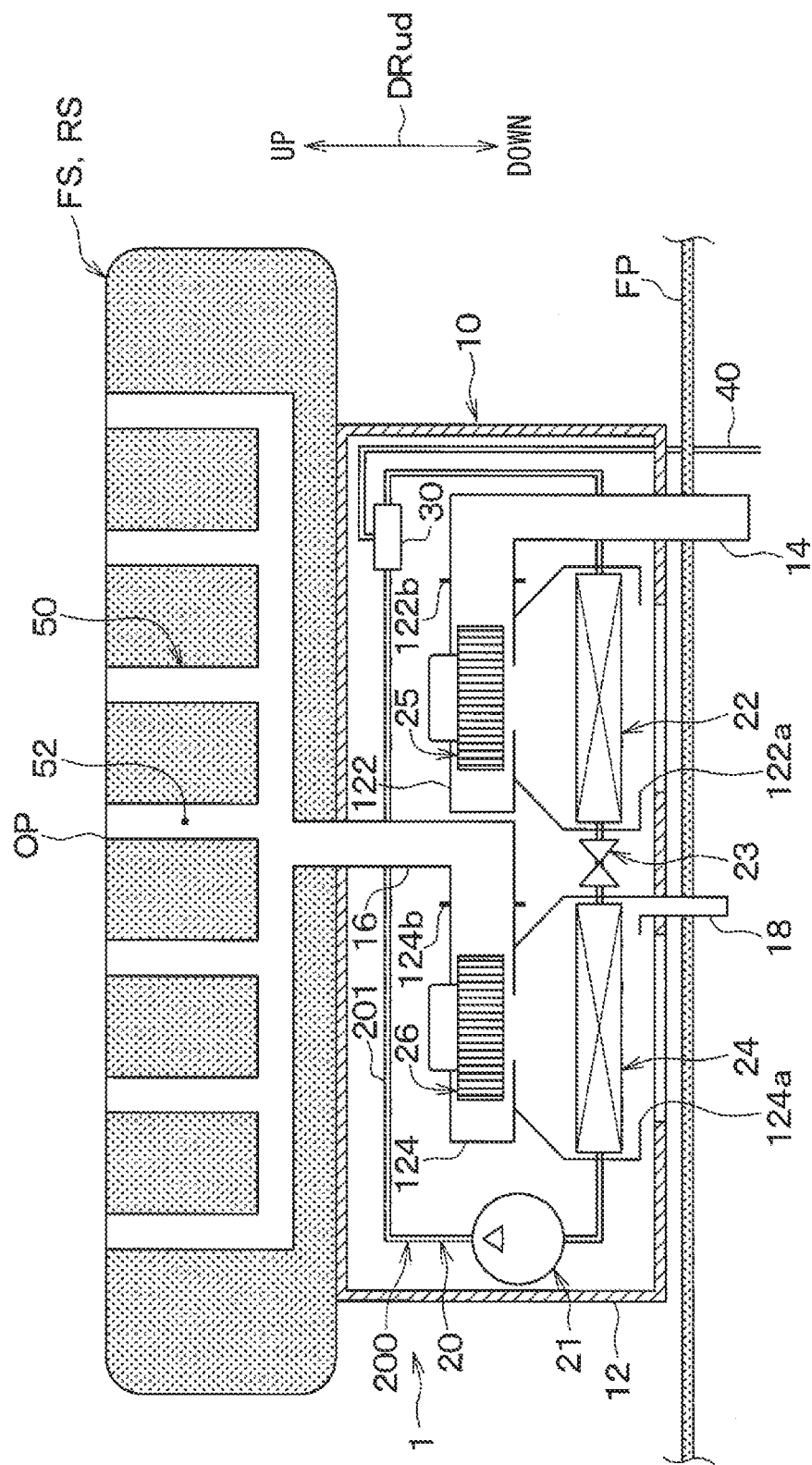
FIG. 2 is a schematic diagram illustrating an air conditioning unit of the air conditioner according to the first embodiment.

As shown in FIG. 2, the vehicle air conditioner 1 includes an air conditioning unit 10 installed in the cabin to generate conditioned air, and a supply unit 50 for supplying the conditioned air generated by the air conditioning unit 10 into the cabin via the seat FS, RS.

The air conditioning unit 10 of this embodiment is configured integrally with the seat FS, RS. Specifically, the air conditioning unit 10 of the present embodiment is installed on the bottom of the seat FS, RS facing a floor material FP of the vehicle MV so as not to affect the design of the cabin. Further, the air conditioning unit 10 is arranged to move together with the seat FS, RS when the seat FS, RS is slid in the front-rear direction DRfr.

The supply unit 50 includes an air guiding path 52 that guides the conditioned air generated by the air conditioning unit 10 to an air outlet OP of the seat FS, RS. The air guiding path 52 is formed inside of the seat FS, RS. Note that the air guiding path 52 may be formed inside a duct arranged adjacent to the seat FS, RS.

The air conditioning unit 10 of the present embodiment is arranged in a dead space between the seat FS, RS and the floor material FP of the vehicle MV. For this reason, the air conditioning unit 10 is smaller than an air conditioning apparatus conditioning air for the entire cabin.

The air conditioning unit 10 of the present embodiment is configured to generate cool air having a temperature lower than that of the cabin as conditioned air. The air conditioning unit 10 of this embodiment includes a unit case 12, a refrigeration cycle device 20, and a high-pressure protection device 30 provided in the refrigeration cycle device 20 having a compressor 21, a radiator 22, a decompression device 23, and an evaporator 24.

The unit case 12 forms an outer shell of the air conditioning unit 10. The unit case 12 is made of a resin material (for example, polypropylene) that has elasticity to some extent and is excellent in strength. The refrigeration cycle device 20 and the like are housed inside the unit case 12.

The unit case 12 of the present embodiment includes a heat-source case 122 and a use-side case 124. The heat-source case 122 defines an air passage for air that passes through the radiator 22. The use-side case 124 defines an air passage for air that passes through the evaporator 24. The heat-source case 122 and the use-side case 124 are configured so that the air flowing through the air passage of the heat-source case 122 and the air flowing through the air passage of the use-side case 124 do not mix with each other.

The heat-source case 122 has a heat-source inlet 122a for sucking air from the cabin, and a heat-source outlet 122b. The heat-source outlet 122b of the heat-source case 122 is connected to an exhaust duct 14 for exhausting the air passing through the radiator 22 to the outside of the cabin. The exhaust duct 14 communicates with the outside of the cabin so that the air passing through the radiator 22 is discharged to the outside of the cabin. In the present embodiment, the exhaust duct 14 constitutes an exhaust passage.

The use-side case 124 has a use-side inlet 124a for sucking air from the cabin, and a use-side outlet 124b. The use-side outlet 124b of the use-side case 124 is connected to a supply duct 16 that supplies the air that has passed through the evaporator 24, which will be described later, to the air guiding path 52 as conditioned air.

A drain duct 18 is connected to the use-side case 124 to drain water condensed on the surface of the evaporator 24 to the outside of the cabin. In the present embodiment, the drain duct 18 constitutes a drain passage.

The refrigeration cycle device 20 is a vapor compression refrigeration cycle in which the compressor 21, the radiator 22, the decompression device 23, and the evaporator 24 are annularly connected by a refrigerant pipe 200. In the refrigeration cycle device 20 of this embodiment, an HFC-based refrigerant (for example, R134a) is used as the refrigerant. As the refrigerant, an HFO-based refrigerant (for example, R1234yf), a natural refrigerant (for example, carbon dioxide) or the like may be adopted.

The air conditioning unit 10 of the present embodiment is configured integrally with the seat FS, RS. After the air conditioning unit 10 is attached to the seat FS, RS, it becomes practically difficult to fill and/or replace the refrigerant in the refrigeration cycle device 20.

For this reason, in the refrigeration cycle device 20 of the present embodiment, a refrigerant charging port that may cause a refrigerant leak is physically closed by a joining technique such as brazing after the refrigerant is charged into the cycle. That is, the refrigeration cycle device 20 of the present embodiment has no filling port for refilling the refrigerant.

The compressor 21 of the refrigeration cycle device 20 is an electric compressor in which a compression mechanism is driven by an electric motor activated by an on-vehicle battery (not shown). Further, the compressor 21 of the present embodiment is a hermetically sealed compressor in which the compression mechanism and the electric motor are housed inside a housing hermetically sealed by welding or the like to restrict a refrigerant leak.

The radiator 22 is connected to the refrigerant discharge side of the compressor 21. The radiator 22 is a heat exchanger that radiates heat of the refrigerant discharged from the compressor 21. The radiator 22 of the present embodiment functions as a heat-source side heat exchanger in which heat is exchanged between air to be exhausted outside of the cabin and the refrigerant. The radiator 22 of the present embodiment is the other heat exchanger that does not function as a use-side heat exchanger.

The radiator 22 of the present embodiment is provided with an exhaust blower 25 for guiding the flow of air passing through the radiator 22 to the exhaust duct 14. The exhaust blower 25 is an electric blower activated by power supply from an on-vehicle battery. The exhaust blower 25 of the present embodiment is arranged between the radiator 22 and the heat-source outlet 122b in the heat-source case 122. The exhaust blower 25 may be disposed between the heat-source inlet 122a and the radiator 22 in the heat-source case 122.

Specifically, in the present embodiment, the radiator 22 and the exhaust blower 25 are arranged in series in the up-down direction DRud in order to make the air volume balance uniform in the radiator 22.

The decompression device 23 is connected to the refrigerant outlet side of the radiator 22. The decompression device 23 decompresses the refrigerant that has passed through the radiator 22. The decompression device 23 of the present embodiment is a fixed throttle with a fixed aperture. The decompression device 23 may be, for example, an electric expansion valve or a mechanical expansion valve.

The evaporator 24 is connected to the refrigerant outlet side of the decompression device 23. The evaporator 24 is a heat exchanger that evaporates the refrigerant that has passed through the decompression device 23. The evaporator 24 of the present embodiment is an endothermic heat exchanger that cools air to be supplied into the cabin by utilizing the endothermic action of the refrigerant during evaporation. In the present embodiment, the evaporator 24 functions as a use-side heat exchanger that generates conditioned air by exchanging heat between air to be supplied to the cabin and the refrigerant.

The evaporator 24 of the present embodiment is provided with a supply blower 26 for guiding the flow of air passing through the evaporator 24 to the supply duct 16. The supply blower 26 is an electric blower activated by power supply from an on-vehicle battery. The supply blower 26 of the present embodiment is arranged between the evaporator 24 and the use-side outlet 124b in the use-side case 124. The supply blower 26 may be disposed between the use-side inlet 124a and the evaporator 24 in the use-side case 124.

Specifically, in the present embodiment, the evaporator 24 and the supply blower 26 are arranged in series in the up-down direction DRud in order to make the air volume balance uniform in the evaporator 24.

Figure 3:
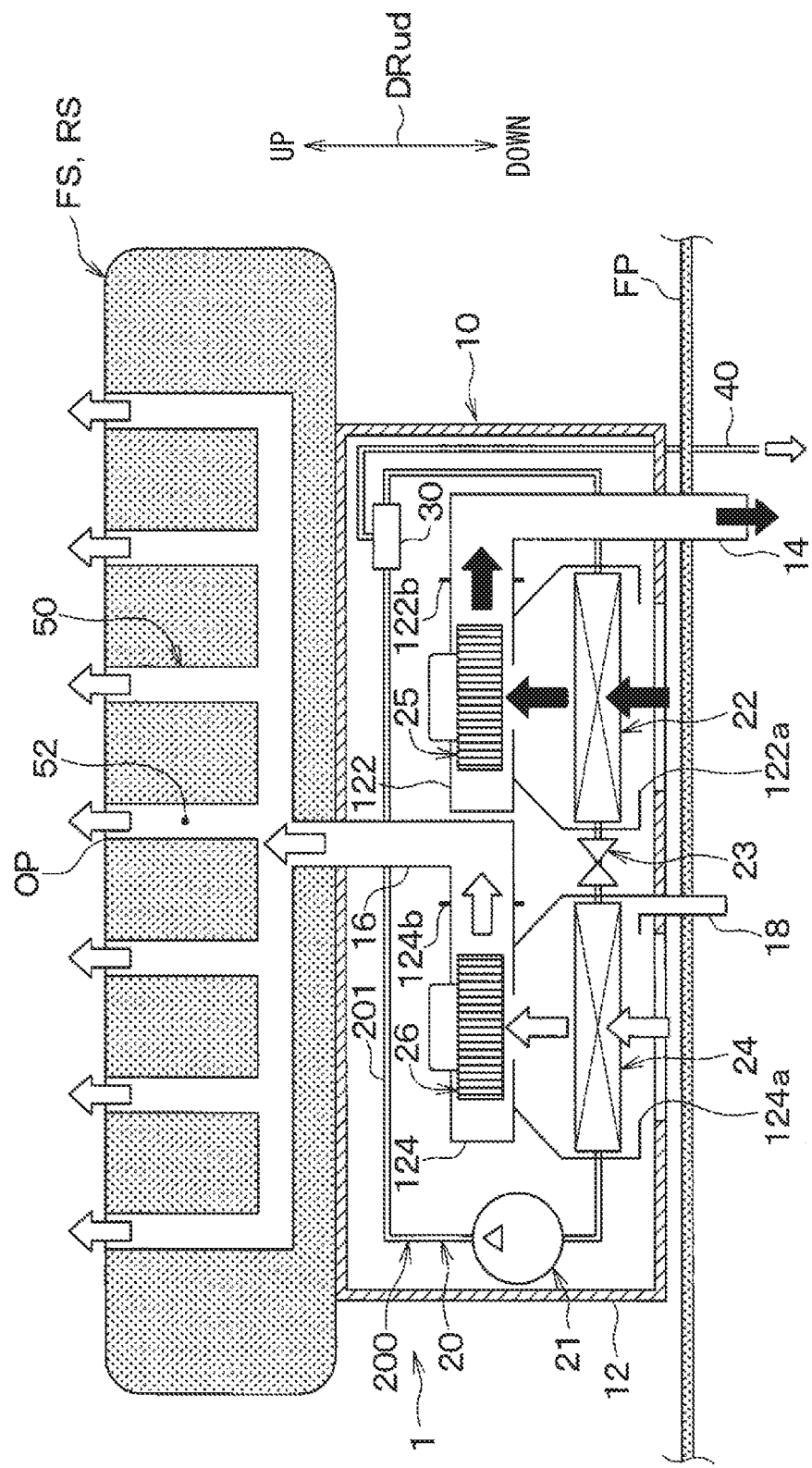
FIG. 3 is a diagram for explaining operation of the air conditioning unit of the air conditioner according to the first embodiment.

In the refrigeration cycle device 20 configured as described above, when the compressor 21 is driven by the power supply from the on-vehicle battery, the refrigerant discharged from the compressor 21 flows into the radiator 22. In the radiator 22, the refrigerant flowing inside the radiator 22 exchanges heat with air sucked into the heat-source case 122 by the exhaust blower 25 to radiate heat. At this time, as shown in FIG. 3, the air having received heat in the radiator 22 from the refrigerant is exhausted to the outside of the cabin by the exhaust blower 25 via the exhaust duct 14.

The refrigerant flowing out of the radiator 22 flows into the decompression device 23, and is decompressed to have a predetermined pressure. Then the refrigerant flows into the evaporator 24. In the evaporator 24, the refrigerant flowing inside the evaporator 24 exchanges heat with air sucked into the use-side case 124 by the supply blower 26 to evaporate. At this time, the air passing through the evaporator 24 is cooled by the endothermic action of the refrigerant during evaporation. As shown in FIG. 3, the air cooled by the evaporator 24 passes through the supply duct 16 and the air guiding path 52 formed in the seat FS, RS by the supply blower 26, and then is blown out into the cabin from the blowout part OP of the seat FS, RS.

The refrigerant flowing out of the evaporator 24 is sucked into the compressor 21. The refrigerant sucked into the compressor 21 is compressed again and then discharged toward the radiator 22. As described above, the refrigeration cycle device 20 of the present embodiment is configured to generate the conditioned air by utilizing the heat absorption effect when the refrigerant evaporates.

The refrigeration cycle device 20 is provided with the high-pressure protection device 30 so that the pressure of the refrigerant circulating therein does not have an abnormally high pressure. The high-pressure protection device 30 is configured to discharge the refrigerant to the outside when the pressure of the refrigerant in the high-pressure refrigerant passage 201 defined from the refrigerant discharge side of the compressor 21 to the refrigerant inlet side of the decompression device 23 exceeds a predetermined reference pressure. The high-pressure protection device 30 of the present embodiment is provided between the refrigerant discharge side of the compressor 21 and the refrigerant inlet side of the radiator 22.

A refrigerant discharge duct 40 is connected to the high-pressure protection device 30 to discharge the refrigerant to the outside of the cabin. The refrigerant discharge duct 40 guides the refrigerant to the outside of the cabin, and is configured separately from the exhaust duct 14. Thereby, the high-pressure protection device 30 is configured so that the refrigerant discharged to the outside flows to the refrigerant discharge duct 40.

Figure 4:
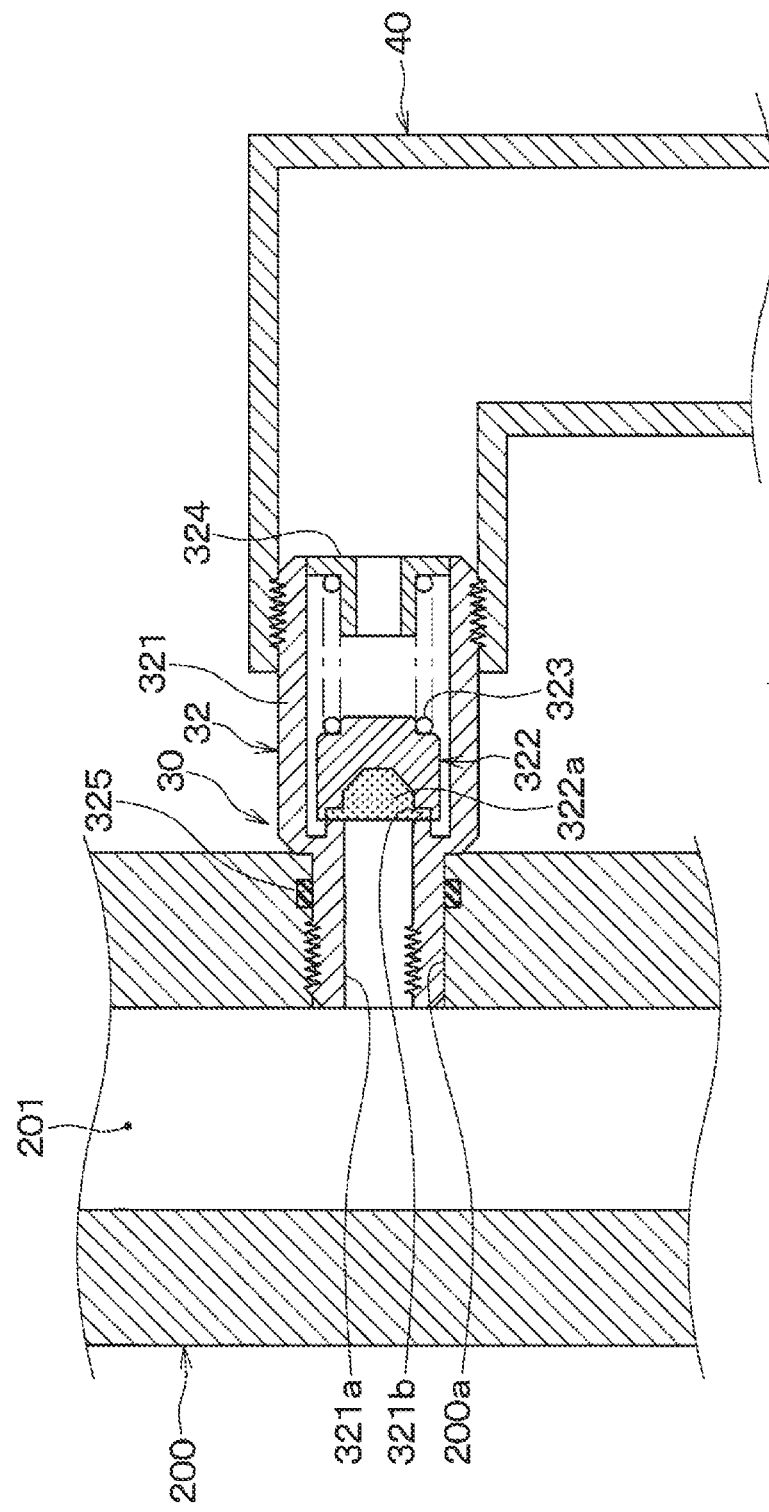
FIG. 4 is a schematic diagram illustrating a high-pressure protection device of the air conditioner according to the first embodiment.

Specifically, the high-pressure protection device 30 includes a relief valve 32, as shown in FIG. 4. The relief valve 32 is attached to a relief opening hole 200a provided in the refrigerant pipe 200 that corresponds to the high-pressure refrigerant passage 201.

The relief valve 32 includes a valve body 321, a valve member 322, a coil spring 323, an adjusting portion 324, and an O-ring 325. The relief valve 32 is assembled to the refrigerant pipe 200 by engagement between a male thread formed on the outer peripheral side of the valve body 321 and a female thread formed on the relief opening hole 200a. At this time, the O-ring 325 provided on the outer peripheral side of the valve body 321 is interposed between the outer periphery of the valve body 321 and the relief opening hole 200a as a seal portion, so that the space between the relief valve 32 and the refrigerant pipe 200 is sealed.

A through hole 321a is formed in the valve body 321. One open end of the through hole 321a is positioned inside the refrigerant pipe 200, and the other open end of the through hole 321a is positioned outside the refrigerant pipe 200. The valve body 321 has a valve seat 321b in the middle of the through hole 321a, and the valve member 322 comes in contact with or separates from the valve seat 321b.

The valve member 322 is housed inside the valve body 321. The valve member 322 is arranged to come into contact with or separate from the valve seat 321b. The valve member 322 has a seal member 322a at a location in contact with the valve seat 321b.

The coil spring 323 is housed inside the valve body 321 to generate a biasing force that pushes the valve member 322 toward the valve seat 321b. The coil spring 323 is arranged in a compressed state.

The adjusting portion 324 adjusts the biasing force of the coil spring 323. The adjusting portion 324 is assembled to the valve body 321 by engagement between the male thread formed on the outer peripheral side of the adjusting portion 324 and the female thread formed on the through hole 321a.

In the relief valve 32 configured as described above, the coil spring 323 urges the valve member 322 against the valve seat 321b. On the other hand, the pressure of the refrigerant flowing through the refrigerant pipe 200 pushes the valve member 322 against the biasing force of the coil spring 323. Therefore, when the pressure of the refrigerant flowing through the refrigerant pipe 200 exceeds the reference pressure that is equal to or greater than the biasing force of the coil spring 323, the valve member 322 separates from the valve seat 321b. As a result, the relief valve 32 is opened.

Figure 5:
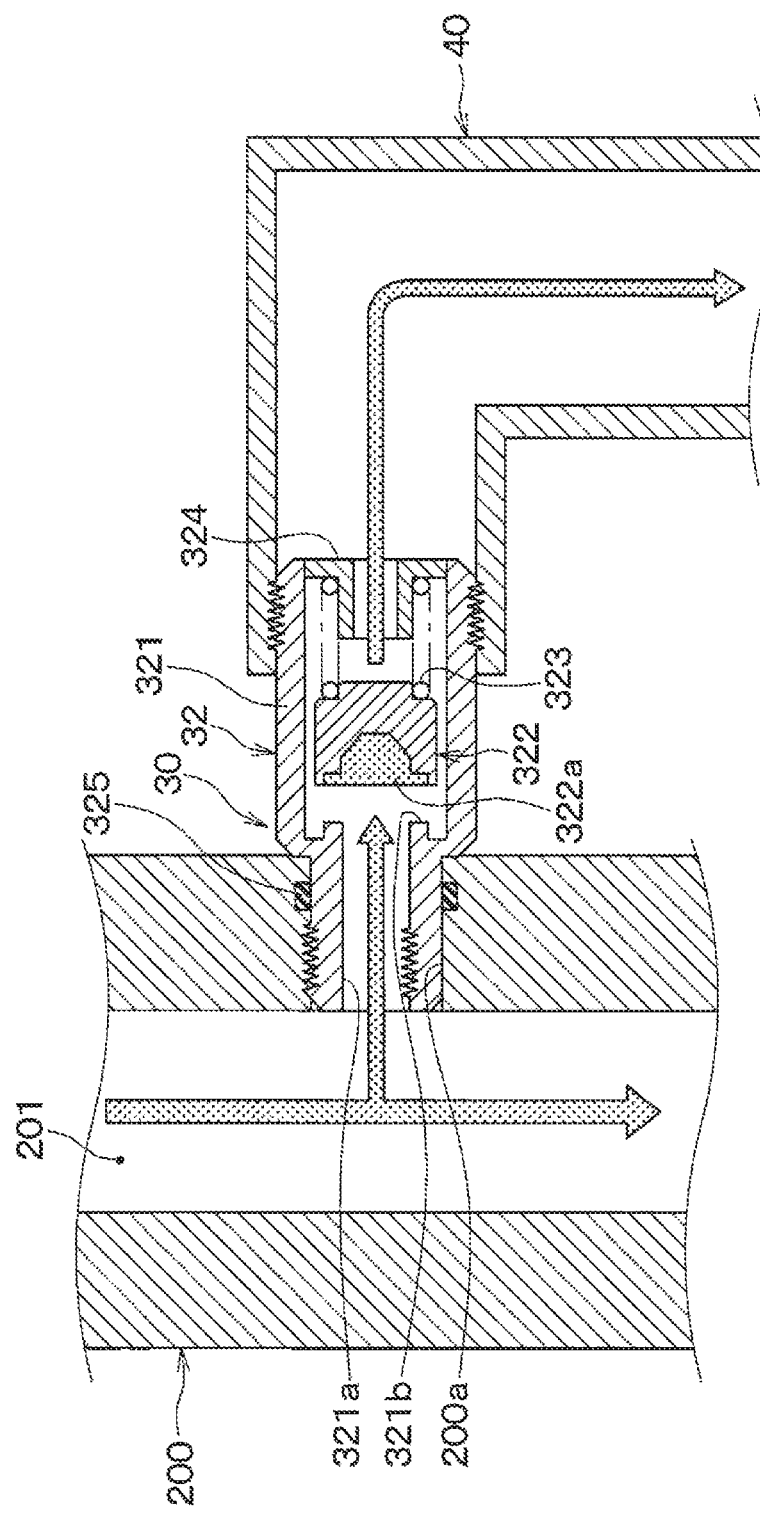
FIG. 5 is a diagram for explaining operation of the high-pressure protection device of the air conditioner according to the first embodiment.

The relief valve 32 is connected to the refrigerant discharge duct 40 for guiding the refrigerant discharged from the relief valve 32 to the outside of the cabin when the relief valve 32 is opened. As a result, as shown in FIG. 5, the refrigerant discharged from the relief valve 32 is discharged to the outside of the cabin through the refrigerant discharge duct 40.

The vehicle air conditioner 1 of the present embodiment described above is configured such that the refrigerant discharged from the high-pressure protection device 30 to the outside flows into the refrigerant discharge duct 40 communicated with the outside of the cabin. Accordingly, even if the air conditioning unit 10 including the compressor 21, the radiator 22, the decompression device 23, and the evaporator 24 is arranged in the cabin, it is possible to suppress the discharge of the refrigerant into the cabin.

In the present embodiment, the air conditioning unit 10 is installed on the bottom of the seat FS, RS that faces the floor material FP of the vehicle MV. In this way, when the air conditioning unit 10 is installed in the dead space of the cabin, it is possible to improve the comfort in the cabin while ensuring the space in the cabin.

Modification of First Embodiment

In the first embodiment, the relief valve 32 is adopted as the high-pressure protection device 30, but is not limited to this. As the high-pressure protection device 30, for example, a burst disk 33 may be adopted. The same also applies to the following embodiments.

Figure 6:
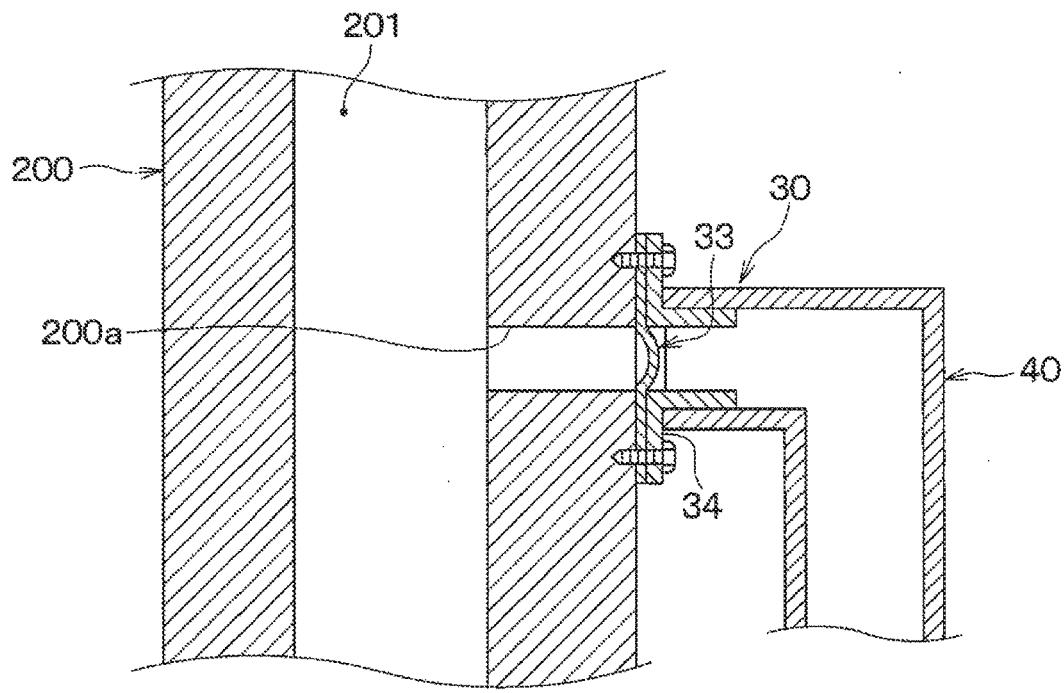
FIG. 6 is a schematic view illustrating a high-pressure protection device that is a modified example of the air conditioner according to the first embodiment.

As shown in FIG. 6, the burst disk 33 is arranged, for example, to cover the relief opening hole 200a. The burst disk 33 has a thin portion so as to be broken when the pressure of the refrigerant flowing inside the refrigerant pipe 200 becomes equal to or higher than a predetermined reference pressure. The burst disk 33 is attached to the refrigerant pipe 200 by a cylindrical holder 34. The refrigerant discharge duct 40 is connected to the cylindrical holder 34.

Figure 7:
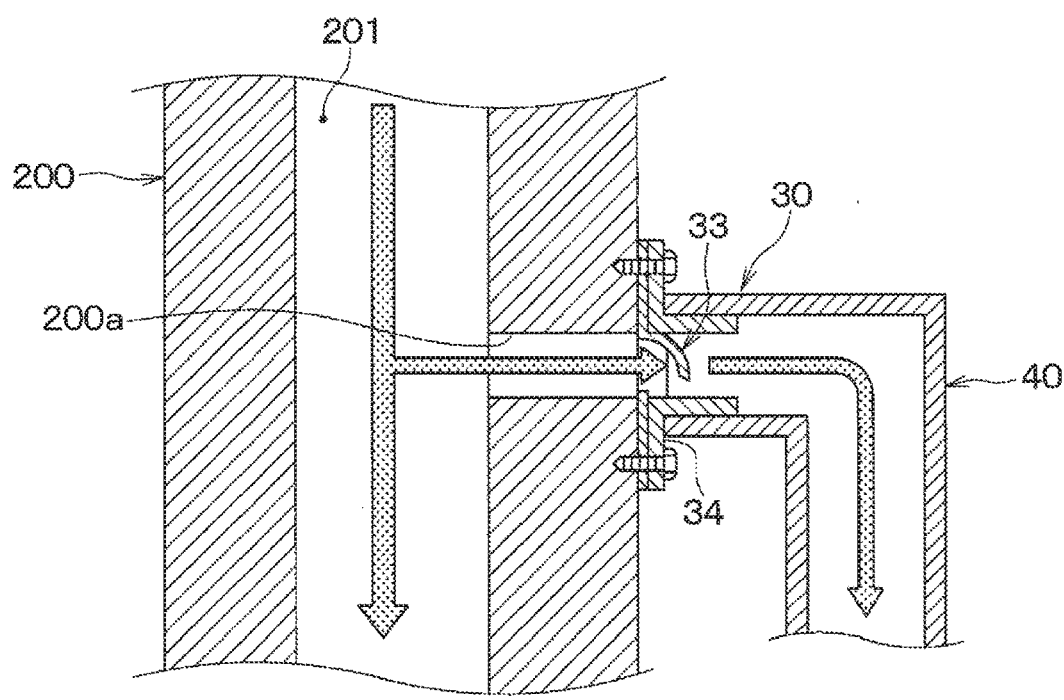
FIG. 7 is a diagram for explaining operation of the high-pressure protection device that is a modified example of the air conditioner according to the first embodiment.

The thin portion of the burst disk 33 breaks when the pressure of the refrigerant flowing through the refrigerant pipe 200 exceeds a predetermined reference pressure. As a result, as shown in FIG. 7, the refrigerant discharged from the burst disk 33 is discharged to the outside of the cabin through the refrigerant discharge duct 40.

Unlike the relief valve 32, the burst disk 33 does not require the O-ring 325, so that the refrigerant does not leak through the O-ring 325. Therefore, the burst disc 33 is suitable for the refrigeration cycle device 20 in which refilling of the refrigerant is difficult as in the first embodiment.

Second Embodiment

Next, a second embodiment will be described with reference to FIG. 8. The present embodiment is different from the first embodiment in that a refrigerant discharge duct 40A is connected to the exhaust duct 14. In the present embodiment, parts different from the first embodiment will be mainly described, and description of the same parts as the first embodiment will be appropriately omitted.

Figure 8:
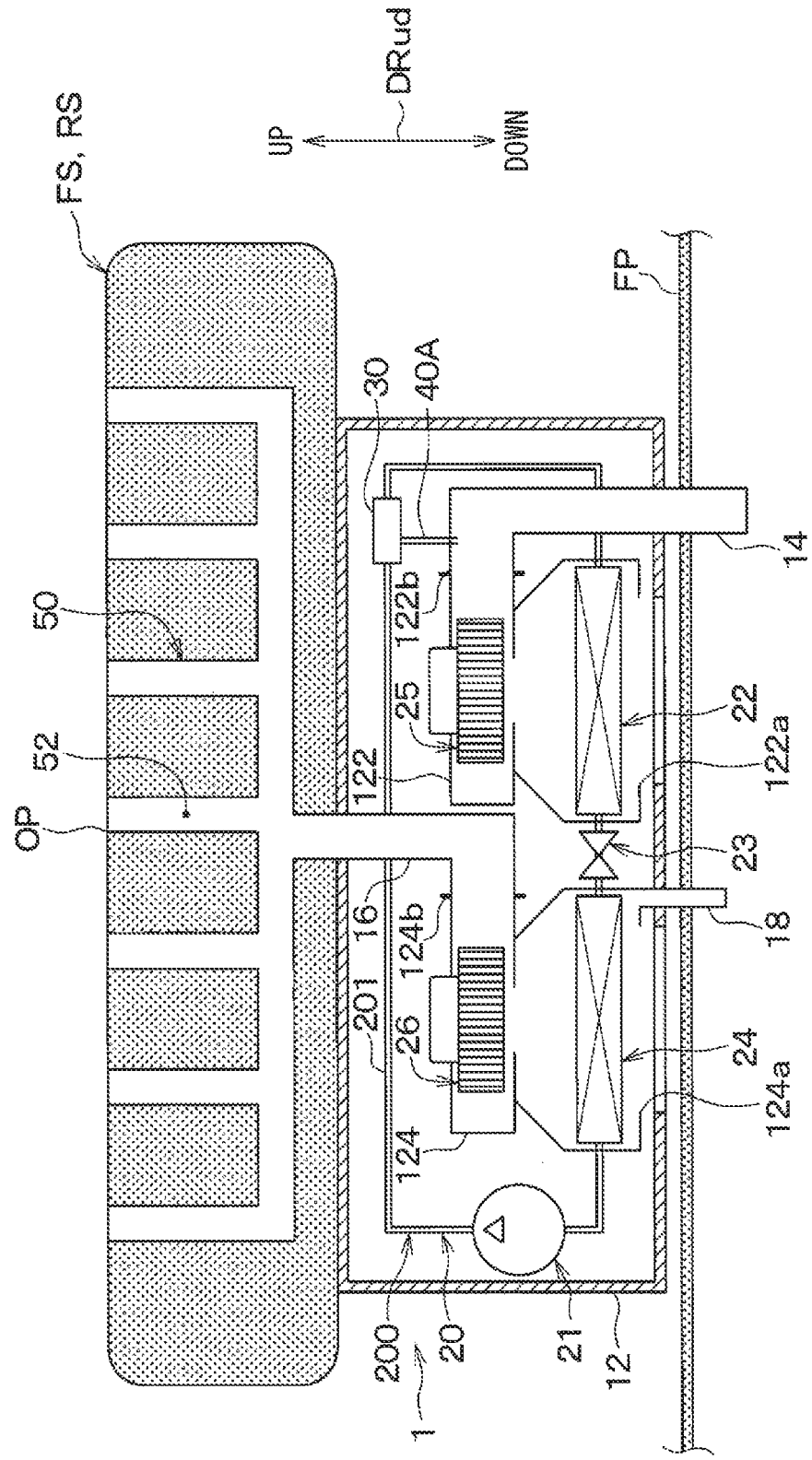
FIG. 8 is a schematic diagram illustrating an air conditioning unit of an air conditioner according to a second embodiment.

As shown in FIG. 8, one end of the refrigerant discharge duct 40A of the present embodiment is connected to the high-pressure protection device 30, and the other end of the refrigerant discharge duct 40A is connected to the exhaust duct 14. As a result, the high-pressure protection device of this embodiment is configured so that the refrigerant discharged to the outside flows to the outside of the cabin through the exhaust duct 14. In the present embodiment, the refrigerant discharge duct 40A and the exhaust duct 14 form an outside communication portion.

The other configurations are the same as those of the first embodiment. The vehicle air conditioner 1 of the present embodiment can obtain the same operations and effects as those of the first embodiment with the same configuration as that of the vehicle air conditioner of the first embodiment.

In the present embodiment, the outside communication portion that discharges the refrigerant to the outside of the cabin includes the exhaust duct 14 that exhausts air from the air conditioning unit 10 to the outside of the cabin. According to this, the simple configuration of the vehicle air conditioner 1 can be provided, as compared with the case where the dedicated passage portion (that is, the refrigerant discharge duct 40) for discharging the refrigerant to the outside of the cabin is separately provided as in the first embodiment.

Modification of Second Embodiment

Figure 9:
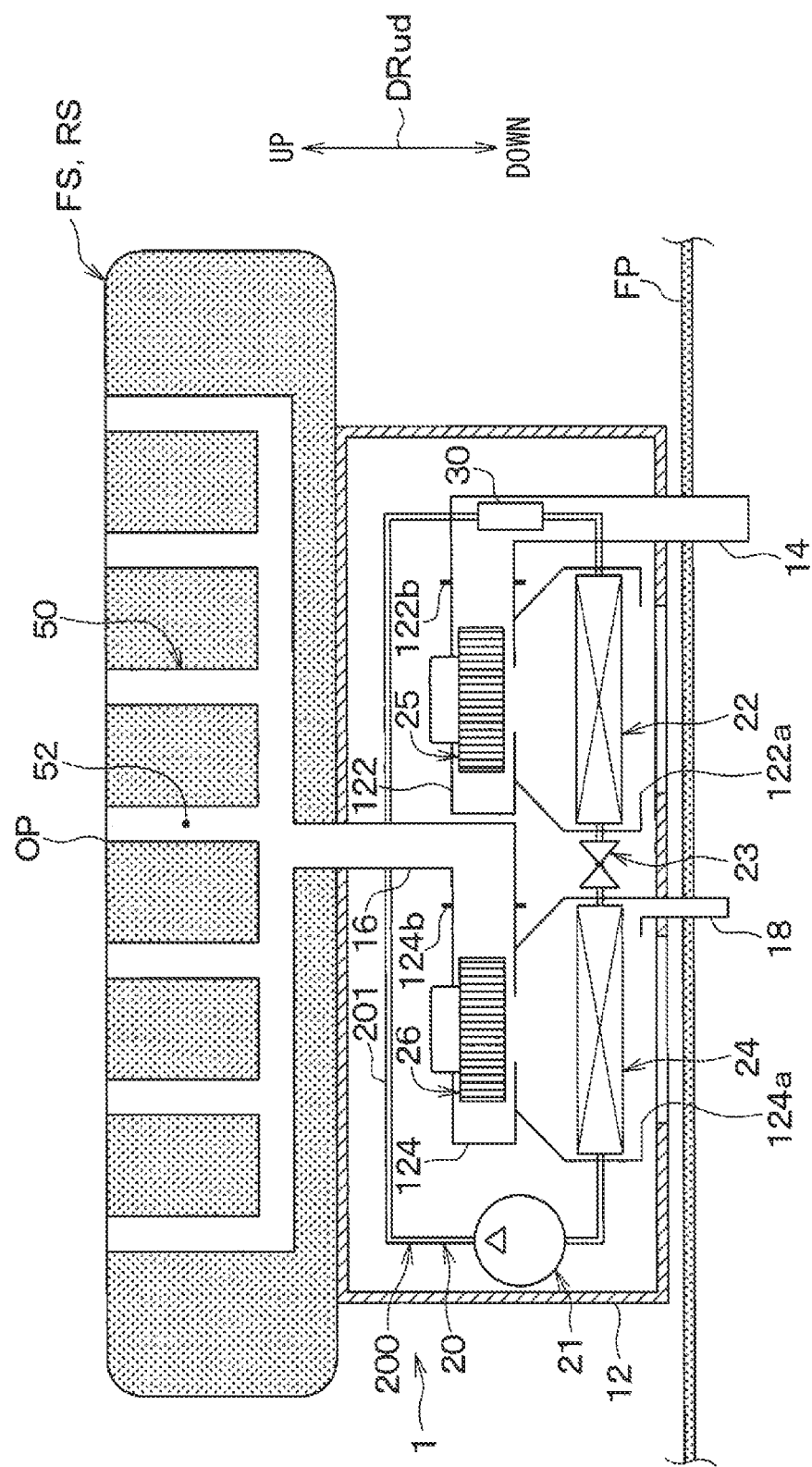
FIG. 9 is a schematic diagram illustrating a modified example of the air conditioning unit of the air conditioner according to the second embodiment.

In the second embodiment, the refrigerant discharge duct 40A is connected to the exhaust duct 14, but is not limited to this. In the vehicle air conditioner 1, for example, as shown in FIG. 9, the entire high-pressure protection device 30 may be arranged inside the exhaust duct 14. According to this, since the refrigerant discharge duct 40A is not required, it can be realized with a simple configuration of the vehicle air conditioner 1. Further, in this modification, the refrigerant discharged from the high-pressure protection device 30 flows directly to the exhaust duct 14, so that there is an advantage that it is not necessary to secure the sealing property of the connecting portion between the ducts.

FIG. 9 illustrates that the entire high-pressure protection device 30 is arranged inside the exhaust duct 14, but is not limited to this. At least a portion of the high-pressure protection device 30 for discharging the refrigerant to the outside may be arranged inside the exhaust duct 14.

Third Embodiment

Next, a third embodiment will be described with reference to FIG. 10. The present embodiment is different from the first embodiment in that a refrigerant discharge duct 40B is connected to the drain duct 18. In the present embodiment, parts different from the first embodiment will be mainly described, and description of the same parts as the first embodiment will be appropriately omitted.

Figure 10:
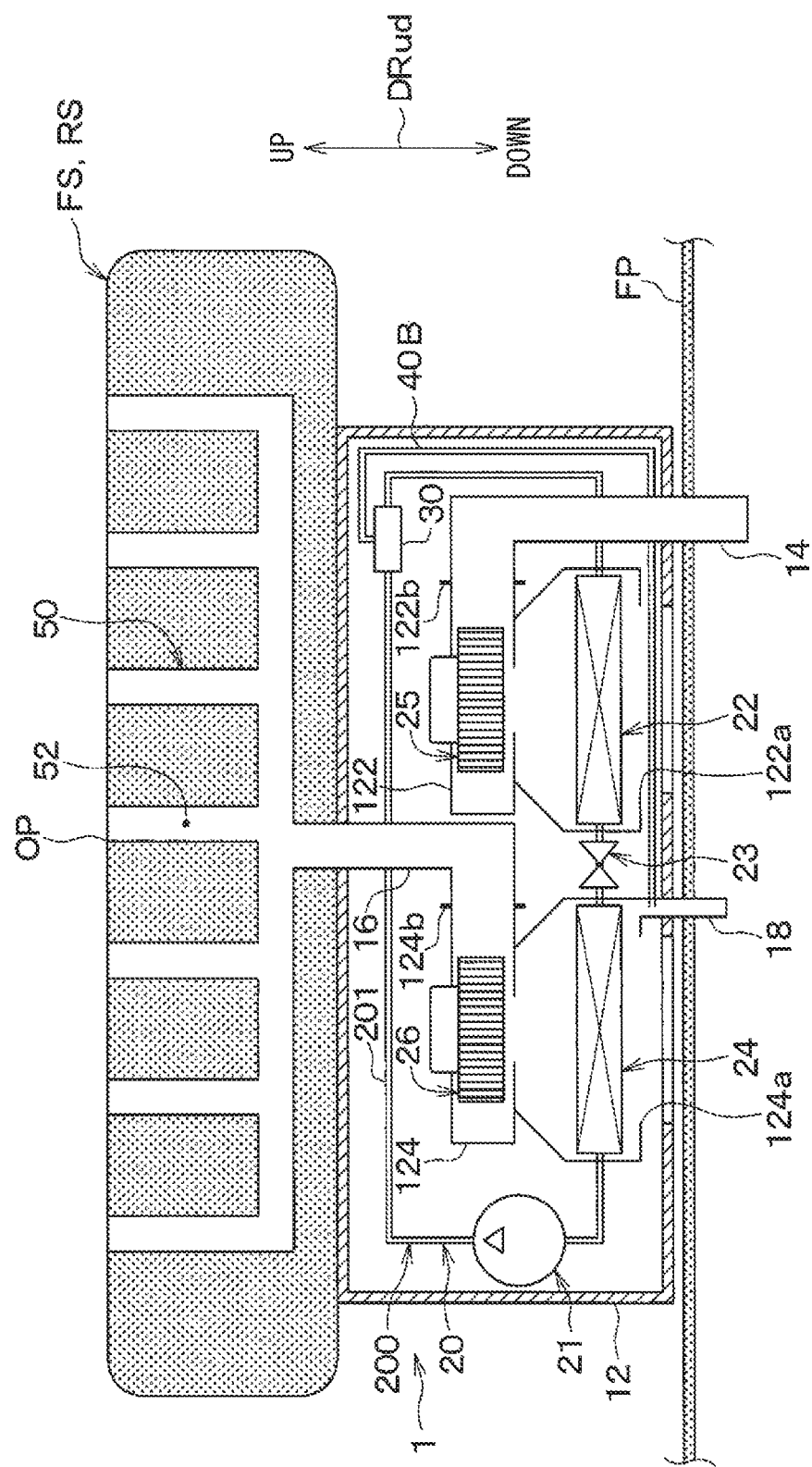
FIG. 10 is a schematic diagram illustrating an air conditioning unit of an air conditioner according to a third embodiment.

As shown in FIG. 10, one end of the refrigerant discharge duct 40B of the present embodiment is connected to the high-pressure protection device 30, and the other end of the refrigerant discharge duct 40B is connected to the drain duct 18. As a result, the high-pressure protection device of this embodiment is configured so that the refrigerant discharged to the outside flows through the drain duct 18 to the outside of the cabin. In the present embodiment, the refrigerant discharge duct 40B and the drain duct 18 form an outside communication portion.

The other configurations are the same as those of the first embodiment. The vehicle air conditioner 1 of the present embodiment can obtain the same operations and effects as those of the first embodiment with the same configuration as that of the vehicle air conditioner of the first embodiment.

In the present embodiment, the outside communication portion that discharges the refrigerant to the outside of the cabin includes the drain duct 18 that drains the condensed water from the air conditioning unit 10 to the outside of the cabin. According to this, the simple configuration of the vehicle air conditioner 1 can be provided, as compared with the case where the dedicated passage portion (that is, the refrigerant discharge duct 40) for discharging the refrigerant to the outside of the cabin is separately provided as in the first embodiment.

Modification of Third Embodiment

When the refrigerant discharge duct 40B is connected to the drain duct 18 as in the third embodiment, there is a concern that a part of the refrigerant flowing in the drain duct 18 may flow back into the use-side case 124 since the supply blower 26 draws air.

Figure 11:
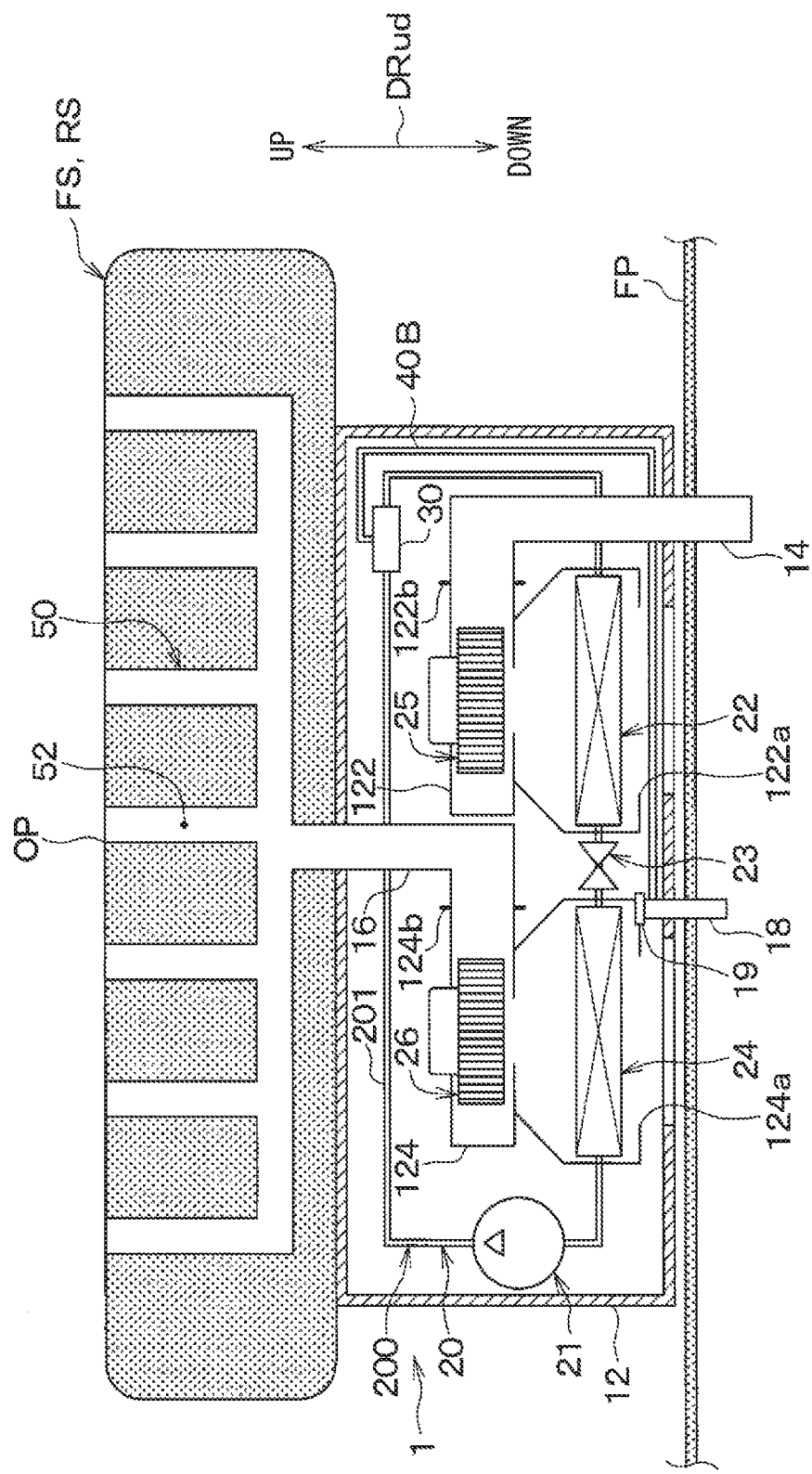
FIG. 11 is a schematic diagram illustrating a modified example of the air conditioning unit of the air conditioner according to the third embodiment.

For this reason, as shown in FIG. 11, it is desirable to provide a backflow prevention mechanism 19 upstream of the connection portion between the drain duct 18 and the refrigerant discharge duct 40B in the flow of condensed water. The backflow prevention mechanism 19 is configured to allow the flow of fluid from the use-side case 124 to the drain duct 18 and to block the flow of fluid from the drain duct 18 to the use-side case 124.

In the third embodiment, the refrigerant discharge duct 40B is connected to the drain duct 18, but is not limited to this. In the vehicle air conditioner 1, for example, the entire high-pressure protection device 30 may be arranged inside the drain duct 18. According to this, since the refrigerant discharge duct 40B is not necessary, it can be realized with a simple configuration of the vehicle air conditioner 1. Further, in this case, since the refrigerant discharged from the high-pressure protection device 30 directly flows to the drain duct 18, there is an advantage that it is not necessary to secure the sealing property of the connecting portion between the ducts.

Note that the high-pressure protection device 30 is not limited to one that is disposed inside the drain duct 18 as a whole, and at least a portion of the high-pressure protection device 30 that discharges the refrigerant to the outside may be disposed inside the exhaust duct 14.

Other Embodiments

Although representative embodiments of the present disclosure have been described above, the present disclosure is not limited to the embodiments described above, and various modifications can be made, for example, as follows.

In the embodiments, the refrigeration cycle device 20 has no filling port for refilling the refrigerant, but is not limited to this. The refrigeration cycle device 20 may have a filling port for refilling the refrigerant.

In the embodiments, the compressor 21 is configured by a hermetic compressor, but the compressor 21 is not limited to this. The compressor 21 may be, for example, a semi-hermetic type compressor or an open type compressor.

In the embodiments, the evaporator 24 functions as a use-side heat exchanger that generates conditioned air by heat exchange between refrigerant and air, but is not limited to this. The vehicle air conditioner 1 may be configured such that the radiator 22, instead of the evaporator 24, functions as a use-side heat exchanger that generates conditioned air by heat exchange between refrigerant and air. In this case, the evaporator 24 is the other heat exchanger that does not function as the use-side heat exchanger.

In the embodiments, the seat air conditioner is exemplified as the vehicle air conditioner 1 of the present disclosure, but is not limited to this. The vehicle air conditioner 1 of the present disclosure may be configured as, for example, a ceiling air conditioner installed on a ceiling portion of the vehicle MV.

The constituent element(s) of each of the above embodiments is/are not necessarily essential unless it is specifically stated that the constituent element(s) is/are essential in the above embodiment, or unless the constituent element(s) is/are obviously essential in principle.

Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure.

Furthermore, in each of the above embodiments, in the case where the shape of the constituent element(s) and/or the positional relationship of the constituent element(s) are specified, the present disclosure is not necessarily limited to the shape of the constituent element(s) and/or the positional relationship of the constituent element(s) unless the embodiment specifically states that the shape of the constituent element(s) and/or the positional relationship of the constituent element(s) is/are necessary or is/are obviously essential in principle.

(Overview)

According to the first aspect described in a part or all of the embodiments, the air conditioning unit includes the refrigeration cycle device installed in the cabin of the vehicle. The refrigeration cycle device has the high-pressure protection device that discharges the refrigerant to the outside when the pressure of the refrigerant flowing through the high-pressure refrigerant passage exceeds a predetermined reference pressure. The high-pressure protection device is configured so that the refrigerant discharged to the outside flows to the outside communication portion communicated with the outside of the cabin.

Further, according to the second aspect, the air conditioner has an exhaust passage for exhausting air, which exchanges heat with the refrigerant flowing through the other of the radiator and the evaporator not functioning as the use-side heat exchanger, to the outside of the cabin. The outside communication portion includes the exhaust passage. In this way, when the outside communication portion that discharge the refrigerant to the outside of the cabin is configured to include the exhaust passage that exhausts air from the air conditioning unit, it can be realized with a simple configuration of the air conditioner, compared with a case where a dedicated passage for discharging the refrigerant to the outside of the cabin is separately provided.

Further, according to the third aspect, at least a portion of the high-pressure protection device for discharging the refrigerant to the outside is arranged inside the exhaust passage. According to this, since a dedicated passage for discharging the refrigerant is not required, it can be realized with a simple configuration of the air conditioner.

Further, according to the fourth aspect, the air conditioner includes an exhaust blower that generates a flow of air from the other heat exchanger toward the exhaust passage. According to this, since the backflow of the refrigerant is suppressed by the air flowing through the exhaust passage, it is possible to sufficiently suppress the inflow of the refrigerant into the cabin.

Further, according to the fifth aspect, the air conditioner includes a drain passage that drains water condensed on the surface of the evaporator to the outside of the cabin. The outside communication portion includes the drain passage. In this way, when the outside communication portion that discharges the refrigerant to the outside of the cabin includes the drain passage that drains the condensed water from the air conditioning unit, it can be realized with a simple configuration of the vehicle air conditioner, compared with a case where a dedicated passage for discharging the refrigerant to the outside of the cabin is provided.

Further, according to the sixth aspect, the air conditioning unit of the air conditioner is installed adjacent to the bottom of the seat facing the floor material of the vehicle in the cabin. The supply unit has an air guide path that guides conditioned air generated by the air conditioning unit to the air outlet provided on the surface of the seat. In this way, when the air conditioning unit is installed adjacent to the bottom of the seat, which is a dead space in the cabin, it is possible to improve the comfort in the cabin while ensuring the space in the cabin.

What is claimed is:

1. An air conditioner for a vehicle comprising:
   an air conditioning unit disposed in a cabin of the vehicle to generate conditioned air; and
   a supply unit configured to supply the conditioned air generated by the air conditioning unit into the cabin, wherein
   the air conditioning unit includes a refrigeration cycle device having a compressor for compressing and discharging a refrigerant, a radiator for radiating heat of the refrigerant discharged from the compressor, a decompression device for decompressing the refrigerant passing through the radiator, and an evaporator for evaporating the refrigerant passing through the decompression device,
   a high-pressure refrigerant passage is defined from a refrigerant discharge side of the compressor to a refrigerant inlet side of the decompression device,
   one of the radiator and the evaporator functions as a use-side heat exchanger that generates the conditioned air by heat exchange between refrigerant and air,
   the refrigeration cycle device includes a high-pressure protection device configured to discharging the refrigerant to the outside when a pressure of the refrigerant flowing through the high-pressure refrigerant passage exceeds a predetermined reference pressure, and
   the high-pressure protection device is configured to discharge the refrigerant to the outside through an outside communication portion communicated with outside of the cabin.

2. The air conditioner according to claim 1, further comprising an exhaust passage configured to exhaust air, which has exchanged heat with the refrigerant flowing through the other of the radiator and the evaporator, to the outside of the cabin, wherein the outside communication portion includes the exhaust passage.

3. The air conditioner according to claim 2, wherein a part of the high-pressure protection device that discharges the refrigerant to the outside is positioned inside the exhaust passage.

4. The air conditioner according to claim 2, further comprising an exhaust blower configured to generate a flow of air from the other of the radiator and the evaporator toward the exhaust passage.

5. The air conditioner according to claim 1, further comprising a drain passage configured to drain water condensed on a surface of the evaporator to the outside of the cabin, wherein the outside communication portion includes the drain passage.

6. The air conditioner according to claim 1, wherein
   the air conditioning unit is installed adjacent to a bottom of a seat arranged in the cabin to face a floor material of the vehicle, and
   the supply unit includes an air guiding path configured to guide the conditioned air generated by the air conditioning unit to an air outlet provided on a surface of the seat.

* * * * *